United States Patent
Conley

(10) Patent No.: US 10,321,662 B2
(45) Date of Patent: Jun. 18, 2019

(54) PET FEEDING STATION WITH ADJUSTABLE INCLINED FOOD BOWL

(71) Applicant: Charles Conley, Janesville, WI (US)

(72) Inventor: Charles Conley, Janesville, WI (US)

( * ) Notice: Subject to any disclaimer, the term of this patent is extended or adjusted under 35 U.S.C. 154(b) by 255 days.

(21) Appl. No.: 15/451,403

(22) Filed: Mar. 6, 2017

(65) Prior Publication Data

US 2018/0249677 A1    Sep. 6, 2018

(51) Int. Cl.
| A01K 5/01 | (2006.01) |
| A01K 7/00 | (2006.01) |
| F16M 11/10 | (2006.01) |
| F16M 11/00 | (2006.01) |

(52) U.S. Cl.
CPC .............. *A01K 5/0135* (2013.01); *A01K 7/00* (2013.01); *F16M 11/10* (2013.01)

(58) Field of Classification Search
CPC ........................... A01K 5/0135; A01K 5/0114
USPC ........................................................ 119/51.5
See application file for complete search history.

(56) References Cited

U.S. PATENT DOCUMENTS

| | | | | |
|---|---|---|---|---|
| 514,203 A * | 2/1894 | Schmidt | ................... | A01K 5/01 119/61.1 |
| 927,722 A * | 7/1909 | Frambach | ............. | F21V 21/116 248/229.17 |
| 1,855,314 A * | 4/1932 | Schacht | ................... | A01K 5/01 119/51.5 |
| 2,723,037 A * | 11/1955 | Matesic | ................. | A47B 13/16 108/44 |
| 3,651,787 A * | 3/1972 | Cooper | ................. | A01K 5/0114 119/51.01 |
| 4,658,759 A | 4/1987 | Brown | | |
| 4,901,989 A * | 2/1990 | Stellato | ..................... | B25H 1/00 269/17 |
| 4,976,223 A * | 12/1990 | Pierce | .................. | A01K 5/0114 119/61.56 |
| 5,000,124 A * | 3/1991 | Bergen | ................. | A01K 5/0114 119/63 |
| 5,141,194 A * | 8/1992 | Burgess | .................. | B60N 3/102 248/150 |
| D331,174 S * | 11/1992 | Polski | ........................... | D7/621 |
| 5,379,978 A * | 1/1995 | Patel | ..................... | B60N 3/102 224/281 |
| 5,501,176 A * | 3/1996 | Tully | .................... | A01K 5/0114 119/61.57 |
| D374,517 S * | 10/1996 | Morrill | ........................ | D30/133 |
| 5,649,499 A * | 7/1997 | Krietzman | .......... | A01K 5/0114 119/52.1 |
| D397,278 S * | 8/1998 | Wang | ............................. | D7/701 |
| 5,975,016 A | 11/1999 | Wesenhagen | | |
| D424,759 S * | 5/2000 | Sipka | .......................... | D30/130 |

(Continued)

FOREIGN PATENT DOCUMENTS

| CA | 2963121 A1 * | 4/2017 | .......... A01K 5/0135 |
| DE | 3300770 A1 * | 7/1984 | .......... A01K 5/0114 |
| GB | 2198928 A * | 6/1988 | .......... A01K 5/0014 |

*Primary Examiner* — Magdalena Topolski
*Assistant Examiner* — Morgan T Barlow

(57) ABSTRACT

A pet feeding station intended to allow pets to grasp all food pieces without pushing the pieces up and out of the food bowl. The feeding station includes two adjacent stands, one for water and an adjustable inclined food bowl that allows food pieces to fall forward toward the front of the bowl, allowing the pet easier access to the food and prevents the food pieces from getting pushed out of the bowl.

2 Claims, 5 Drawing Sheets

(56) References Cited

U.S. PATENT DOCUMENTS

| | | | |
|---|---|---|---|
| 6,945,502 B2 * | 9/2005 | Restifo | A45F 3/44 248/146 |
| 7,341,019 B1 | 3/2008 | Tsengas | |
| 7,762,211 B1 * | 7/2010 | McDaniel | A01K 5/0291 119/51.5 |
| 7,938,083 B1 * | 5/2011 | Huether | A01K 5/0114 119/61.5 |
| 8,397,676 B2 | 3/2013 | Whitney | |
| 8,516,975 B2 | 8/2013 | Becattini, Jr. | |
| D695,974 S * | 12/2013 | Young | D30/130 |
| D700,407 S | 2/2014 | Paschall | |
| 9,144,225 B1 * | 9/2015 | Gaccione | A01K 7/00 |
| D744,174 S | 11/2015 | Jones | |
| 9,226,478 B1 * | 1/2016 | Uhl | A01K 5/0114 |
| D772,494 S | 11/2016 | Wu | |
| D777,993 S | 1/2017 | Green | |
| D787,135 S | 5/2017 | Green | |
| D813,469 S * | 3/2018 | Conley | D30/133 |
| 2003/0106498 A1 * | 6/2003 | Mersits | A01K 5/0142 119/61.53 |
| 2006/0191487 A1 * | 8/2006 | Grant | A01K 5/0114 119/61.54 |
| 2006/0236948 A1 * | 10/2006 | Wechsler | A01K 5/0114 119/77 |
| 2008/0190372 A1 * | 8/2008 | Horvath | A01K 5/0114 119/61.56 |
| 2009/0293811 A1 * | 12/2009 | Wersal | A01K 5/01 119/57.92 |
| 2010/0266270 A1 * | 10/2010 | Pizzo | G03B 17/00 396/420 |
| 2014/0116342 A1 * | 5/2014 | Fuchs | A01K 5/02 119/51.5 |
| 2014/0190419 A1 * | 7/2014 | Harding | A01K 5/0142 119/51.5 |
| 2014/0261203 A1 * | 9/2014 | Renforth | A01K 5/0114 119/61.56 |
| 2015/0313176 A1 * | 11/2015 | Gelinas | B66F 3/08 119/51.5 |
| 2016/0007565 A1 * | 1/2016 | Trottier | A01K 5/02 119/51.02 |
| 2016/0316715 A1 * | 11/2016 | Diamond | F16M 11/24 |
| 2017/0064922 A1 * | 3/2017 | Babal | A01K 7/005 |
| 2017/0071150 A1 * | 3/2017 | Abbey | A01K 5/00 |
| 2017/0105386 A1 * | 4/2017 | Wu | A01K 5/0114 |
| 2017/0245463 A1 * | 8/2017 | Wold | A01K 5/0114 |
| 2018/0014504 A1 * | 1/2018 | Grinnell | A01K 5/0114 |
| 2018/0020637 A1 * | 1/2018 | Macneil | A01K 5/0135 119/61.54 |
| 2018/0070557 A1 * | 3/2018 | Uhl | A01K 5/0114 |
| 2018/0317448 A1 * | 11/2018 | Yang | A01K 5/0114 |

* cited by examiner

23

24

PET FEEDING STATION WITH ADJUSTABLE INCLINED FOOD BOWL

CROSS REFERENCE TO RELATED APPLICATION

Not applicable

FIELD OF INVENTION

This invention pertains to allowing a pet, such as dog, the ability to eat from a bowl without pushing food up and over the sides of the bowl.

BACKGROUND OF THE INVENTION

Many pets eat out of a food bowl and as they use downward pressure to capture their food, often push food pieces up and out of the bowl. This spillage results in a mess on the floor and the pet does not receive proper nourishment. There have been many attempts to remedy this issue in the past, such as creating a stick surface on the bottom of a bowl to prevent slipping so it does move as the pet tries to eat its food. However, this approach only addresses the issue of a food bowl slipping. Other attempts to remedy this issue relate to creating a large lip on the rim of the food bowl in an effort to contain the food within the bowl and prevent the food from getting pushed up and out by the pet's muzzle. However, this approach keeps the food inside, but can make capturing the food even more difficult for the pet by decreasing the area of access to food, especially for larger breeds. Other inventions feature a singular, non-adjustable inclined bowl, but these do not allow for height adjustment to accommodate an individual pet, nor do they allow simultaneous access to a water bowl.

There is a need for a new approach to allow a pet to eat all the food from a food bowl with ease and without spilling portions of their food on the floor.

BRIEF SUMMARY OF THE INVENTION

An exemplary embodiment of this invention is directed toward a feeding station for a pet comprised of two adjacent bowls for water and food in which the food bowl can be inclined forward, allowing a pet to capture all the food without pushing any bits of food up and out of the bowl. As the food bowl is adjusted to incline forward, the food pieces fall forward to the front of the bowl, giving the pet optimal access to the food and the ability to capture all the food without it spilling from the sides. In contrast to a traditional bowl in which the last bits of dog food get pushed to the periphery of the bowl, making it difficult for the pet to capture with its mouth, the food continually falls to the front of the bowl where it is easier for the pet to grasp.

DETAILED DESCRIPTION OF THE INVENTION

Figure 1:
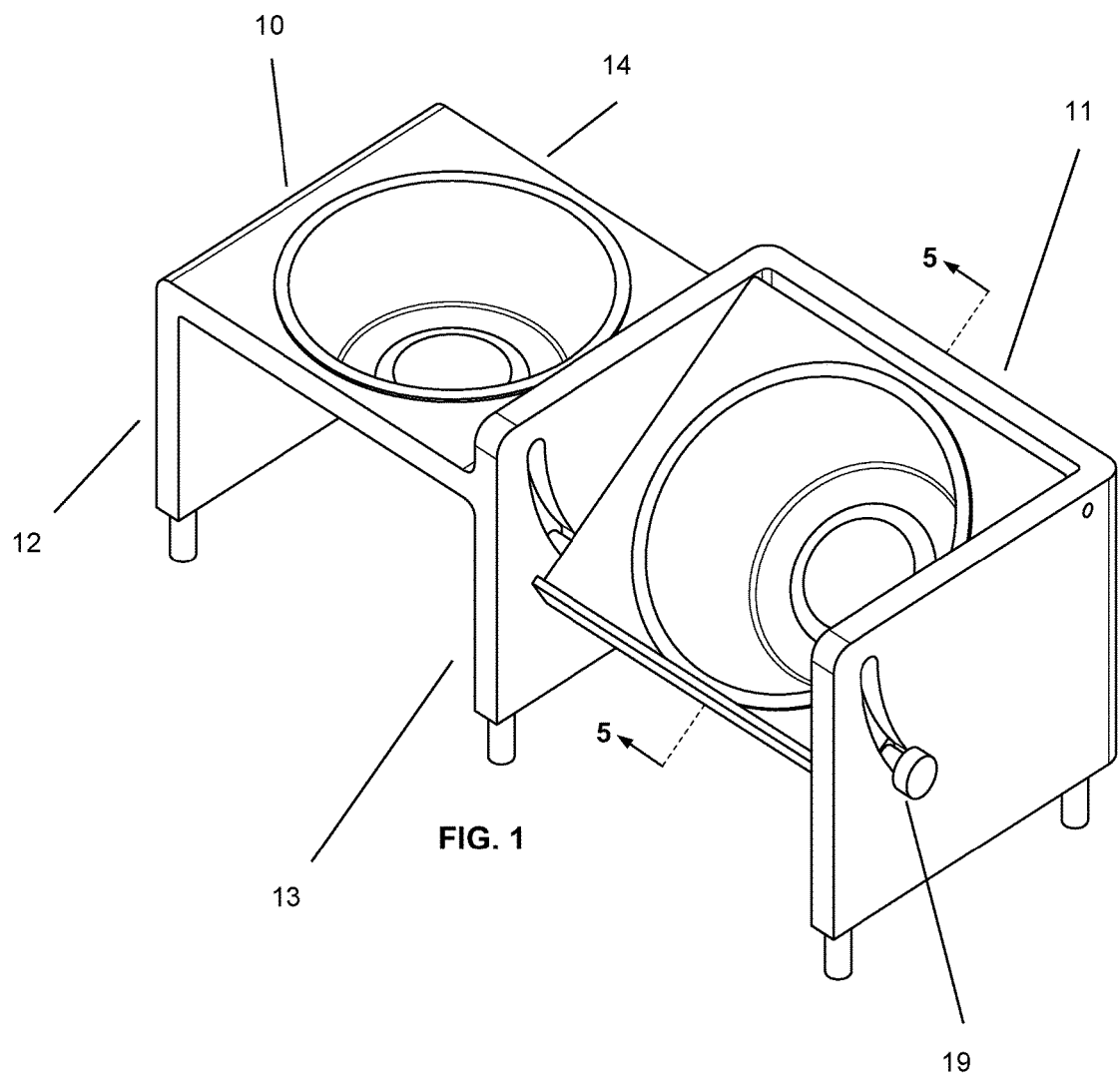
FIG. 1 is a front, top, right perspective view show an exemplary pet feeding station.
Figure 2:
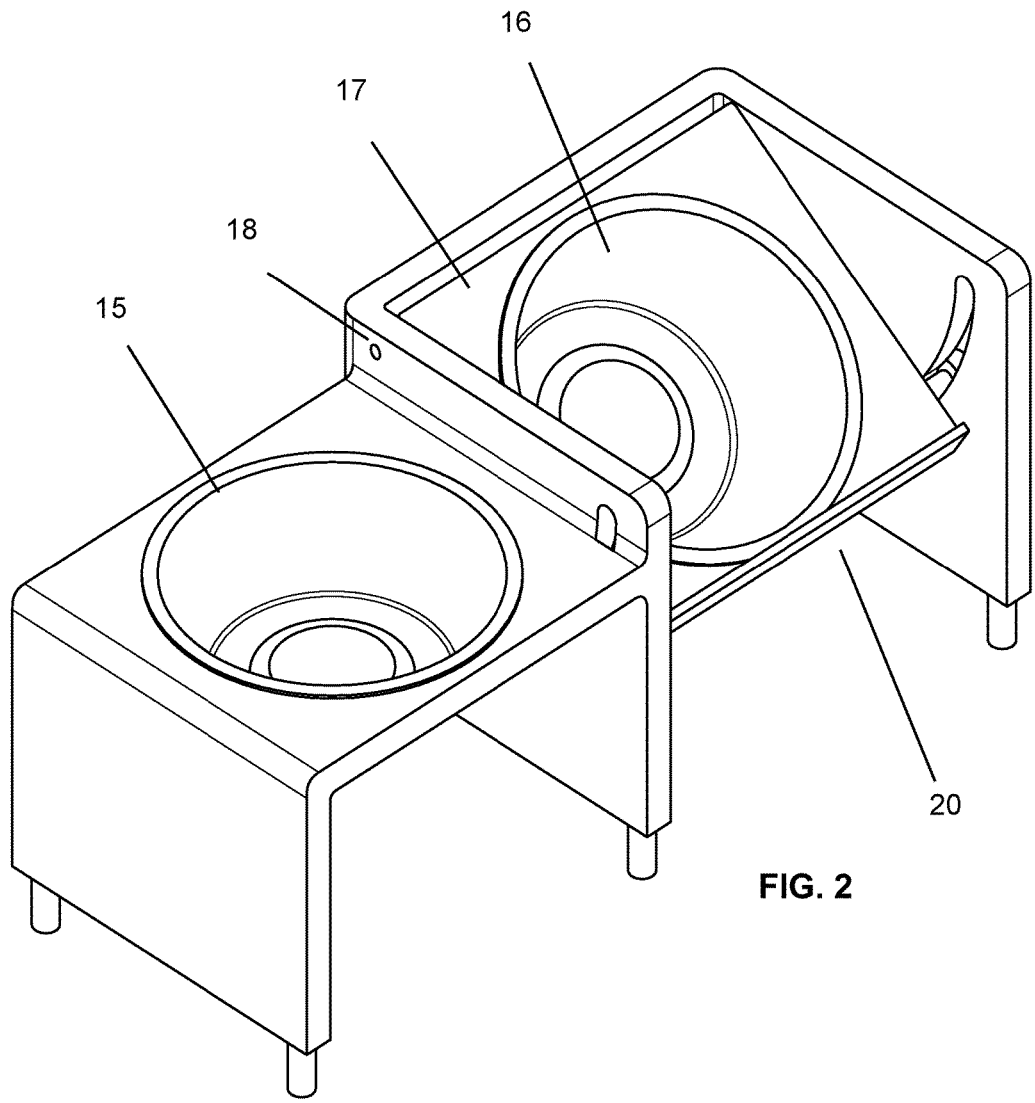
FIG. 2 is a front, top left perspective view thereof.

FIGS. 1 and 2 show an exemplary embodiment of the invention where a pet feeding station comprises of two adjacent stands (10) and (11), each made of two side panels (12) and (13) and a top panel (14). The top panel of both stands has a circular cut out into which a bowl (15) fits. The bowl (15) is a standard bowl that tapers outwards towards the top. The diameter of bowl is slightly larger than the circular cutouts of the top panel of the stand (14), allowing the bowl to rest securely in the cut out of both stands (10) and (11). The rear top panel of the food stand (17) is attached to a hinge (18) which allows the top panel to be inclined downward. The top panel can then be locked into an inclined position by a simple push pin lock (19) on the right side of the food stand (11). The food stand (11) also includes a lip (20) along the front edge of the top panel (17) that catches any food that may spill out of the food bowl (16) while the pet eats, minimizing the spillage of food pieces.

Figure 3:
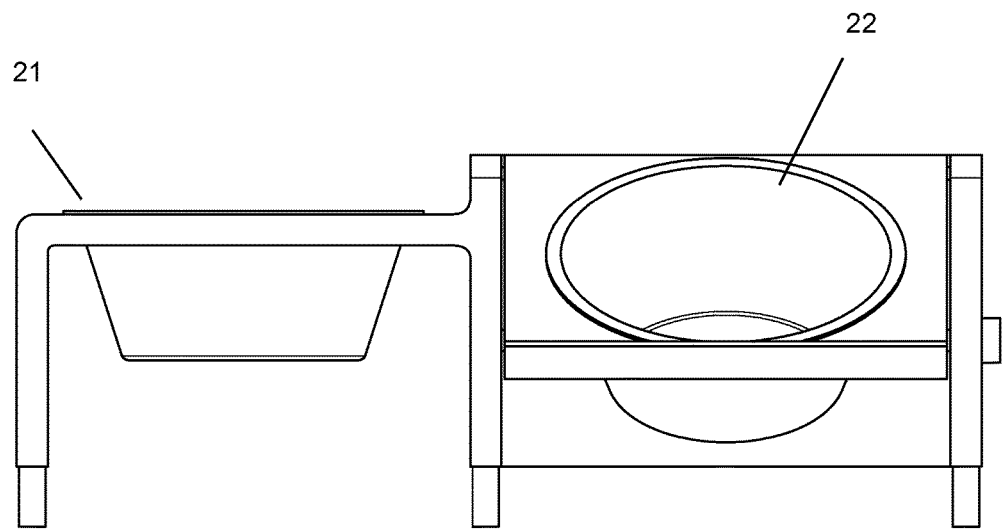
FIG. 3 is the front view thereof.
Figure 4:
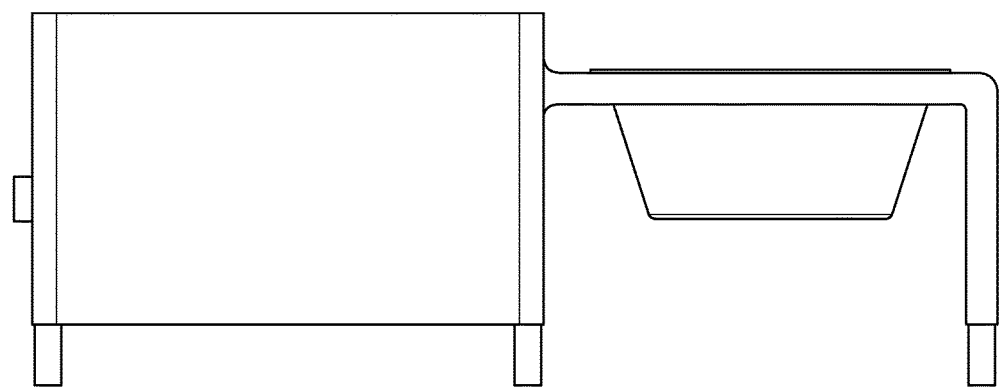
FIG. 4 is the rear view thereof.

FIGS. 3 and 4 show the front and rear views of an exemplary embodiment of the invention, in which the water bowl remains parallel to the floor (21) while the top panel of the food stand (17) can be seen inclined forward (22).

Figure 5:
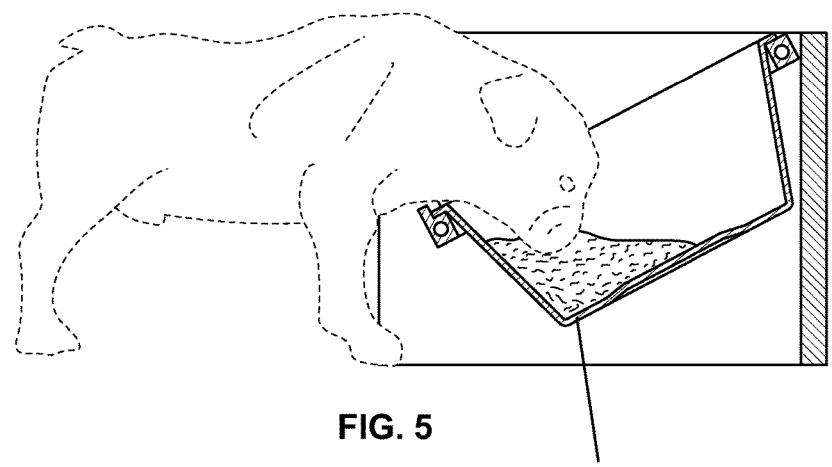
FIG. 5 is a cross-sectional right side view illustrating a pet feeding from the inclined bowl.

FIG. 5 shows a cross-sectional side view showing an exemplary embodiment of the invention in which the inclined food bowl (16) clearly demonstrates how the food pieces (23) will fall forward towards the pet, allowing the pet to continuously grasp the food pieces as the fall to the front of the bowl. FIG. 5 shows the two adjacent stands without legs to accommodate to pets of smaller stature.

Figure 6:
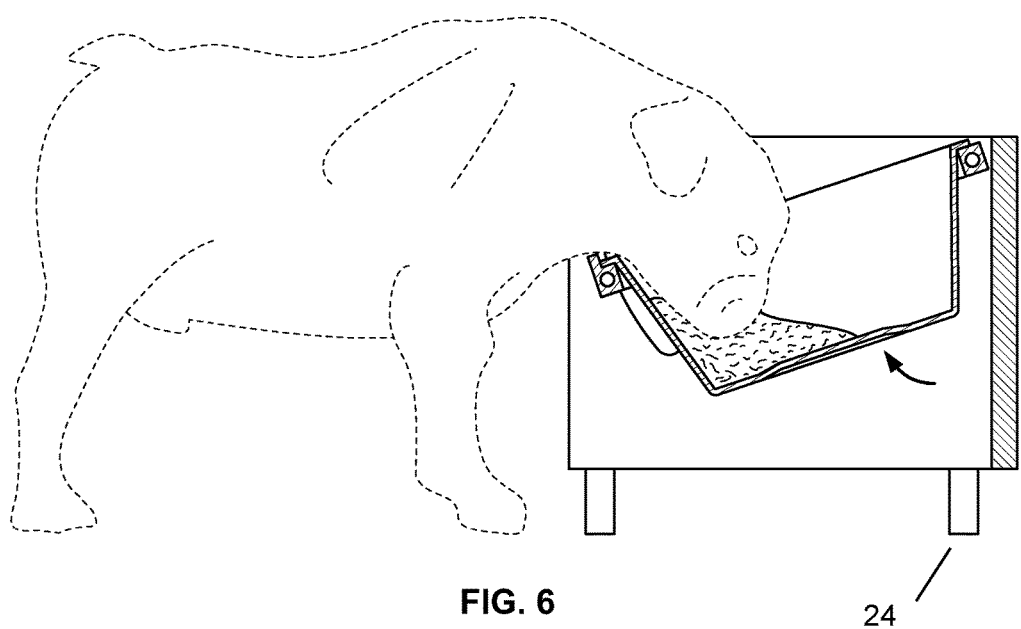
FIG. 6 is a cross-sectional right side view illustrating a pet feed from the inclined bowl on legs.

FIG. 6 shows an additional cross-section view in which the two adjacent stands (10) and (11) are placed upon legs (24) to accommodate larger breeds of pets.

Figure 7:
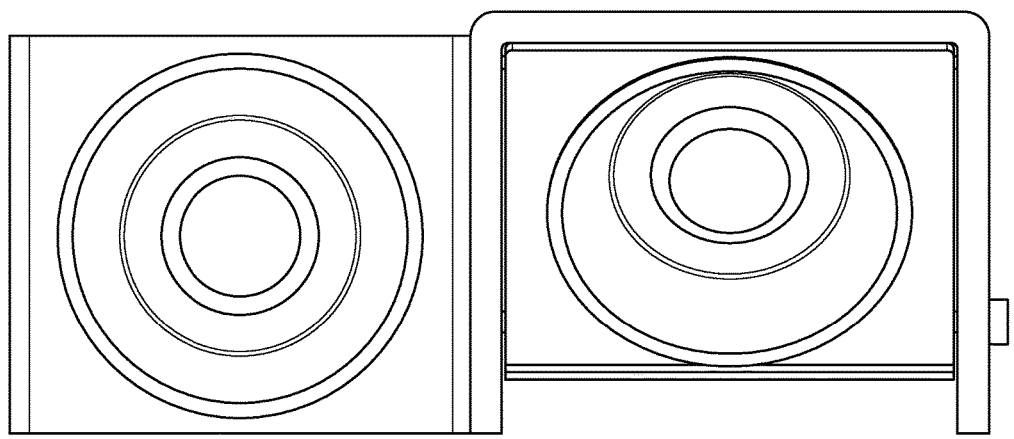
FIG. 7 is a top view.
Figure 8:
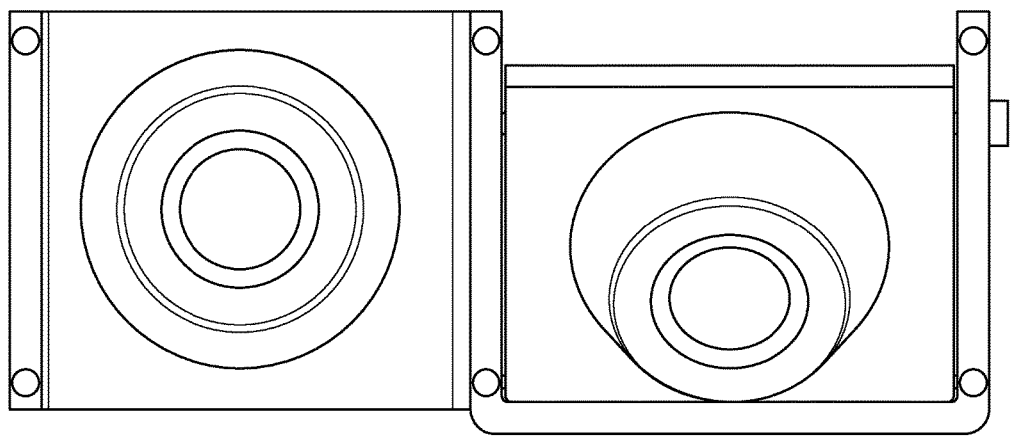
FIG. 8 is a bottom view thereof.

FIGS. 7 and 8 show top and bottom views of an exemplary version of this invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet feeding station comprising:

two adjacent stands each with two lateral side panels, one side panel being common to both stands, and a top panel with a circular cut out and a bowl inserted for at least one of: water and food, a push-pin lock comprising a curved slot formed within the respective side panels, and a pin lockable within the slot;

the top panel of the first of the two stands is attached to a hinge and is capable of being inclined and locked into place with reference to the respective side panels using the push-pin lock, allowing for the at least one of food and water held within the bowl to fall forward towards the front of the bowl for the pet to access without it being pushed up and outside the bowl.

2. The feeding station of claim 1, wherein the top panel of the first stand comprises a lip extending along the entire front edge to further prevent food from falling to the ground.

\* \* \* \* \*